Patented July 3, 1951

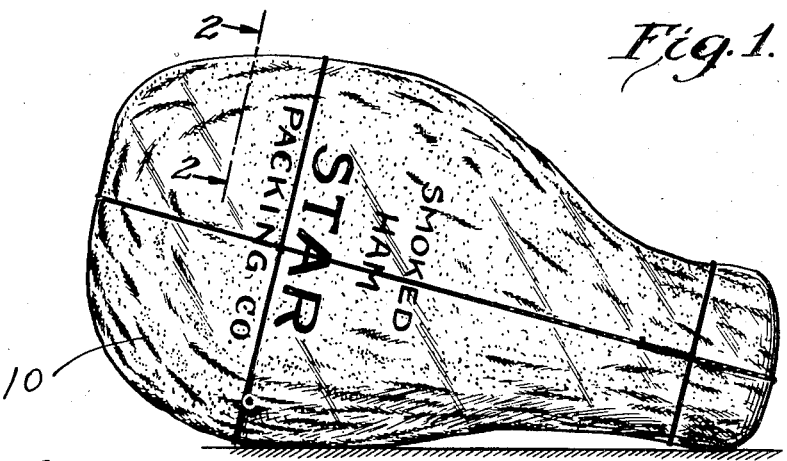
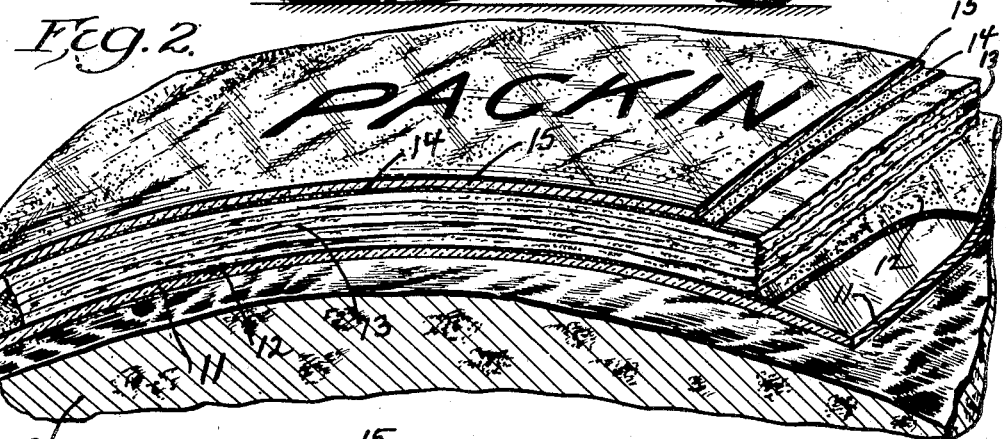
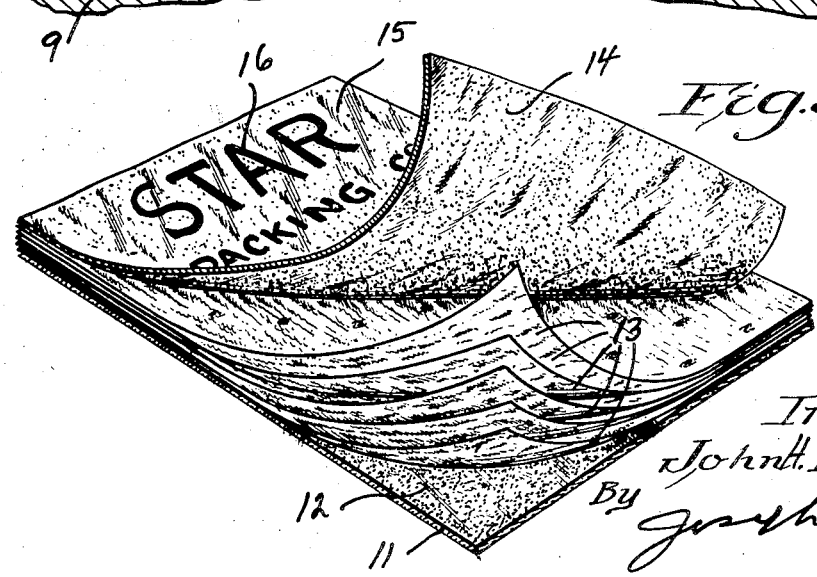

2,559,109

UNITED STATES PATENT OFFICE 2,559,109

LAMINATED SHEET MATERIAL FOR PACKAGING MOISTURE-CONTAINING FOODS

John H. Bonini, Appleton, Wis., assignor to Marathon Corporation, Rothschild, Wis., a corporation of Wisconsin Application March 15, 1946, Serial No. 654,594

5 Claims. (Cl. 154—50)

This invention relates to laminated sheet materials for packaging moisture-containing foods, such as smoked ham, smoked slab bacon, frozen foods and the like.

Hitherto it has been customary when packaging, for example, smoked ham and similar products, to wrap the ham with a set of three loosely superimposed separate and unadhered sheets which are manually assembled by the operator prior to packaging. The individual sheets so used are generally first a sheet of ordinary glassine or greaseproof paper which is placed next to the ham and is used for its greaseproof properties. Then upon this sheet is placed a sheet of so-called gray ham paper which is a relatively thick absorbent sheet material adapted to absorb or take up moisture from the ham in order to prevent mold growth on the surface of the ham. Then upon the second sheet there is placed a third sheet which is disposed on the outside of the package and consists of creped or regular vegetable parchment or other suitable opaque sheet material. This sheet is generally printed on its outer surface with identification or trade-mark indicia and serves as the outer wrapper.

The three sheets as described are manually combined by the operator who assembles them into sets in the order mentioned. These sets of loosely assembled sheets are then transferred to the wrapping station where the product, such as smoked ham, is to be wrapped and is placed on the assembled three-layer sheet. The wrapping operation consists in folding the combined sheets simultaneously around the product.

Efforts have been made from time to time to combine the function of the three separate sheets previously described into a single combined sheet. Such prior attempts to supply a single combined sheet have failed for many reasons, particularly because they lacked workability, were too stiff and lacked pliability in wrapping around irregular objects such as smoked ham. Furthermore, in laminating such three sheets by adhesives one of which is very heavy, such as the gray ham wrapper, the resulting laminated sheet becomes very stiff and is not practical for use in wrapping products such as smoked ham or slab bacon because it lacks workability and pliability.

I have succeeded in overcoming the disadvantages mentioned by providing a combined laminated sheet which in my preferred embodiment consists of a plural-ply sheet, the component sheet materials being adhered together by suitable adhesives, and which has all the necessary properties and characteristics for successful packaging of products such as smoked hams, slab bacon, frozen foods and the like.

Further details and advantages of the invention will be apparent from the following description and drawings wherein:

Figure 1 is a perspective view of a package of smoked ham wrapped in my new sheet material, Figure 2 is an enlarged cross sectional view taken on line 2—2 of Figure 1, and Figure 3 is an enlarged perspective view of my sheet material having the various components thereof separated in order to illustrate the construction thereof.

Referring to the drawings, numeral 10 indicates a smoked ham package utilizing my new wrapper. The ham itself is indicated in Figure 2 by numeral 9. My wrapper consists of a greaseproof sheet 11, preferably glassine, which is adhered by means of a suitable water-permeable starch or glue adhesive 12 to a multi-ply relatively thick embossed creped paper tissue or wadding layer 13. The layers of the wadding may be secured together by spaced punching or by adhesive spots if desired. The creped paper tissue layer 13 is in turn adhered by a suitable wax adhesive composition 14 to a sheet of vegetable parchment, greaseproof paper, wet-strength sulphite paper or other suitable opaque sheet material, indicated by numeral 15, which forms the outer portion of the wrapper and is adapted to be printed on its outer face with indicia or other trade identification marks indicated by numeral 16.

My combined wrapper as previously described has many unique and desirable properties which are particularly advantageous for packaging moisture-containing foods and the like. The greaseproof component of my sheet material is placed next to the moisture-containing food which is being packaged and serves to prevent grease from the surface of the product from migrating or escaping to the inner portion of the wrapper. Also moisture which is found in moisture-containing products, such as smoked ham and slab bacon, tends to migrate through the glassine sheet into the absorbent multi-ply creped tissue. The starch or glue adhesive permits the moisture to migrate or pass through the glassine sheet and to be absorbed by the intermediate creped sheet at the rate at which it migrates through the glassine. The outer sheet 15 is laminated by a suitable wax composition 14 to the inner creped tissue and prevents moisture which is absorbed by the creped tissue from escaping to the outer surface of the outer sheet 15.

My wrapper retains the initial moisture content of the food which is packaged therein and at the same time prevents oil or grease from migrating to the outer surface of the wrapper which ordinarily spoils the appearance of the package. At the same time the absorbent crepe inner layer serves to soak up or absorb the moisture which might be liberated from the surface of the product which is packaged so that no favorable culture medium is provided for the growth of undesirable organisms, such as mold and the like, which will spoil the food in the package in a very short time.

The following is a specific embodiment of my invention suitable for packaging smoked hams. I use a 25-lb. transparent glassine sheet which is laminated by a water-permeable starch adhesive to a four-ply embossed absorbent creped paper wadding. Preferably this wadding is treated with an agent to improve or enhance its wet-strength properties, such as by treating with urea-formaldehyde resin or melamine resin. A 35-lb. wet-strength sheet of sulphite paper is then laminated to the creped wadding by means of microcrystalline wax in any suitable manner. Sufficient weight of the microcrystalline wax is used so as to provide a continuous flexible barrier layer between the outer sulphite sheet and the inner creped wadding so as to provide a film within the laminated sheet which will serve as a barrier against the escape of moisture from the package. Suitable elastomers such as rubber, isobutylene polymers, butyl rubber and the like may be added to the wax in amounts ranging from about 5 to 30% by weight.

The component sheets can be united or laminated in any suitable manner or order as desired. For example, the glassine sheet may be adhered to the creped wadding by means of a starch adhesive in a separate operation and then these two combined sheets are then laminated to the wet-strength sulphite paper by means of hot molten microcrystalline wax using any suitable equipment for accomplishing their adhesion. I prefer to use a creped wadding which is embossed or crinkled so as to provide resiliency and bulk for the intermediate layer. I have also found it advantageous to add to the wax laminant or adhesive suitable mold-preventive substances or anti-mycotic agents which will inhibit or reduce the growth of mold or other undesirable organisms in the package. These anti-biotic substances tend to permeate the intermediate creped wadding and when moisture is absorbed by the creped wadding the anti-biotic substances will inhibit mold growth so that no favorable culture medium will exist at any time during the time the package is in transit or on the shelf prior to getting into the hands of the consumer. Instead of using a multi-ply creped wadding I may use a single sheet of creped wadding or other sheet of highly absorbent material of suitable thickness and weight.

My wrapper eliminates considerable labor in the prior practices which require the assembling of the individual sheets manually by the packager. Such preliminary assembly of the sheet requires space on the packaging floor which is needed for the more important functions of packaging requirements. Furthermore, it is highly undesirable to hnadle individual components of a wrapper which goes into food packages as the likelihood of contamination is greatly enhanced by individual handling of the sheets. Furthermore, dust, dirt and the like may readily get in between the sheets when they are loosely combined. In my laminated sheet materials such disadvantages are definitely obviated because the component sheets of my wrapper are united to each other and are not normally separable from each other. Furthermore, by uniting the three sheets together the combined sheet has greater strength than the individual sheet hitherto used and by embossing the entire assembly the pliability and workability of the sheet is further enhanced as compared with the previous wrappers which have been customarily used. I have conducted a number of tests on hams wrapped in my wrapper and found that as much as 5% saving in shrinkage sustained by holding in normal storage conditions is possible with my new wrapper as compared with the prior wrappers. The size of the overall wrapper can be reduced to fit various sizes of the products to be packaged. For example, in wrapping smoked hams and slab bacon two sizes of the wrapper will be sufficient to wrap nearly all weights of finished smoked hams and bacon, whereas three and four sizes have been used previously in the loose sheet combinations previously described. The adhesive layer 14 in my wrapper provides a continuous moisture barrier which surrounds the article packaged so that practically no loss occurs in the moisture content of the article packaged. The intermediate absorbent layer acts as a moisture balancer for absorbing or giving off moisture depending upon the particular conditions which may prevail. For example, if the package is subjected to temperature conditions which tend to cause moisture to migrate to the surface of the article packaged then the absorbent layer will absorb the liberated moisture. The surface of the article is thus always kept comparatively dry so that it will not be discolored or provide a culture medium for organisms or molds that might cause spoilage and deterioration of the packaged food.

Obviously the novel principles of my invention may be varied greatly in the use of other suitable sheet materials and adhesives for accomplishing the same objectives. My invention is not limited to any of the specific examples herein disclosed which are given merely as illustrative embodiments of my invention. Any suitable equivalent sheet materials can be used for producing my laminated sheet within the spirit and scope of the invention which are intended to be included within the scope of the appended claims as broadly as the prior art will permit.

I claim:

1. Laminated sheet material for packaging moisture-containing foods comprising in adhered relation a sheet of glassine adhered by a starch adhesive to an intermediate multi-ply creped paper wadding layer and a sheet of paper adhered to said wadding by a continuous flexible moistureproof adhesive layer.

2. Laminated sheet material for packaging moisture-containing foods comprising in adhered relation a sheet of glassine adhered by a water-permeable adhesive to an absorbent multi-ply creped paper wadding layer and a sheet of paper adhered to said wadding by a continuous flexible moistureproof adhesive layer.

3. Laminated sheet material for packaging moisture-containing foods comprising in adhered relation a greaseproof sheet adhered by a water-permeable adhesive to a relatively thick absorbent multi-ply creped paper wadding layer and a sheet of paper adhered to said wadding by a continuous flexible moistureproof adhesive layer comprising microcrystalline wax.

4. Laminated sheet material for making a package of a moisture-containing article comprising in adhered relation a sheet of glassine, said glassine being adhered by a starch adhesive to a multi-ply creped paper wadding layer, and an outer sheet of wet-strength paper adhered to said wadding to be presented on the exterior of said package by a continuous flexible moistureproof adhesive layer, said creped paper wadding layer being adapted to absorb moisture given off by the article packaged that migrates through said starch adhesive and being retained within the package by the said continuous flexible moistureproof adhesive layer.

5. Laminated sheet material for making a package of a moisture-containing article comprising in adhered relation a greaseproof sheet, said greaseproof sheet being adhered by a starch adhesive to a relatively thick multi-ply creped paper wadding layer, and an outer sheet of greaseproof paper adhered to said wadding to be presented on the exterior of said package by a continuous flexible moistureproof adhesive layer, said creped paper wadding layer being adapted to absorb moisture given off by the article packaged that migrates through said starch adhesive and being retained within the package by the said continuous flexible moistureproof adhesive layer.

JOHN H. BONINI.

REFERENCES CITED

The following references are of record in the file of this patent:

UNITED STATES PATENTS

| Number | Name | Date |
| --- | --- | --- |
| 1,341,955 | White | June 1, 1920 |
| 1,920,081 | John | July 25, 1933 |
| 2,054,116 | Abrams et al. | Sept. 15, 1936 |
| 2,106,867 | Brady | Feb. 1, 1938 |
| 2,251,372 | Nicholson | Aug. 5, 1941 |
| 2,280,699 | Grant et al. | Apr. 21, 1942 |
| 2,352,293 | Sherman | June 27, 1944 |
| 2,415,387 | Graebner et al. | Feb. 4, 1947 |
| 2,441,477 | Farrell | May 11, 1948 |